(12) United States Patent
Tsuguma

(10) Patent No.: US 11,325,570 B2
(45) Date of Patent: *May 10, 2022

(54) VEHICLE OPERATION PEDAL DEVICE

(71) Applicant: TOYODA IRON WORKS CO., LTD., Toyota (JP)

(72) Inventor: Tomohiro Tsuguma, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/097,696

(22) Filed: Nov. 13, 2020

(65) Prior Publication Data

US 2021/0078549 A1 Mar. 18, 2021

Related U.S. Application Data

(63) Continuation of application No. PCT/JP2019/008047, filed on Mar. 1, 2019.

(30) Foreign Application Priority Data

Jul. 10, 2018 (JP) .............................. JP2018-130479

(51) Int. Cl.
*B60T 7/06* (2006.01)
(52) U.S. Cl.
CPC .................... *B60T 7/065* (2013.01)
(58) Field of Classification Search
CPC .................................................. B60T 7/065
See application file for complete search history.

(56) References Cited

U.S. PATENT DOCUMENTS

| 6,076,422 A | 6/2000 | Tabata |
| 9,981,638 B2 | 5/2018 | Kawazu et al. |
| 2008/0006119 A1* | 1/2008 | Tokumo ................. B60T 7/065 |
| | | 74/560 |

(Continued)

FOREIGN PATENT DOCUMENTS

| JP | 2016-049927 A | 4/2016 |
| JP | 2017-041102 A | 2/2017 |

(Continued)

OTHER PUBLICATIONS

May 28, 2019 International Search Report issued in International Patent Application No. PCT/JP2019/008047.

(Continued)

*Primary Examiner* — Vicky A Johnson
(74) *Attorney, Agent, or Firm* — Oliff PLC

(57) ABSTRACT

Provided is a vehicle operation pedal device comprising: an operation pedal which includes a depressing part provided thereto; a pair of upper support members which are fixed to a dash panel; a pair of lower support members which are fixed to the dash panel and also fixed to the pair of upper support members; an upper center support member which is laid between the pair of upper support members; and a connection hole which supports an operating rod protruding from the dash panel towards a vehicle rear side, such that the operating rod is rotatable with respect to the operation pedal. The upper center support member comprises a sliding receiving part. The pair of upper support members comprise an escape hole.

10 Claims, 9 Drawing Sheets

(56) References Cited

U.S. PATENT DOCUMENTS

| | | | |
|---|---|---|---|
| 2013/0220061 A1* | 8/2013 | O'Neill | B60K 26/02 74/512 |
| 2017/0050625 A1 | 2/2017 | Kawazu et al. | |
| 2020/0241587 A1* | 7/2020 | Tsuguma | G05G 1/327 |

FOREIGN PATENT DOCUMENTS

| | | |
|---|---|---|
| JP | 2017-102546 A | 6/2017 |
| WO | 03/025750 A1 | 6/2003 |
| WO | 2016/035375 A1 | 3/2016 |

OTHER PUBLICATIONS

Mar. 10, 2022 Extended European Search Report issued in European Application No. 19835088.6.

* cited by examiner

VEHICLE OPERATION PEDAL DEVICE

CROSS-REFERENCE TO RELATED APPLICATION

This application is based upon and claims the benefit of priority of the prior Japanese Patent Application No. 2018-130479, filed on Jul. 10, 2018, the entire contents of which are incorporated herein by reference.

FIELD

The present disclosure relates to a vehicle operation pedal device that prevents a depressing part of an operation pedal from moving rearward to a vehicle rear side when vehicle component members are displaced toward the vehicle rear side due to vehicle collision (hereinafter, referred to as "preventing the depressing part of the operation pedal from moving rearward at the time of vehicle collision").

BACKGROUND

Conventionally, various techniques have been suggested for a vehicle operation pedal device that prevents a depressing part of an operation pedal from moving rearward at a time of vehicle collision.

For example, a vehicle pedal device disclosed in Japanese Laid-Open Patent Publication No. 2017-41102 includes a pedal bracket fixed on a rear surface of a dash panel forming a part of a body shell of a vehicle; a pedal extending in a vehicle width direction and rotatably supported by the pedal bracket around a shaft positioned on a rear side relative to the fixing part to the dash panel of the pedal bracket; a lever bracket fixed to the dash panel and separated from the pedal bracket; a fixing means for fixing the pedal bracket to the lever bracket with a prescribed fixing and holding force and releasing the fixation of the pedal bracket and the lever bracket when the pedal bracket receives a force exceeding the fixing and holding force in a direction where the pedal bracket relatively moves downward with respect to the lever bracket; a rotation lever rotatably supported around a rotation shaft extending in the lever bracket in the vehicle width direction; an instrument panel reinforcement fixed to the body shell and supporting an instrument panel; a lever rotation means fixed to the instrument panel reinforcement and rotates the rotation lever by making contact with the rotation lever from the rear side when the lever bracket moves rearward along with the dash panel; a bracket deformation means fixed to the instrument panel reinforcement and deforms the pedal bracket downward by making contact with the pedal bracket from the rear side when the pedal bracket moves rearward along with the dash panel, wherein the vehicle pedal device further includes a pressing part that can press the fixing means or the pedal bracket downward with the force exceeding the fixing and holding force when the rotation lever is rotated by the lever rotation means.

In this structure, the pedal bracket is fixed to the dash panel by fixing the pedal bracket and the lever bracket fixed to the pedal bracket with the prescribed fixing and holding force with respect to the dash panel. A strength of mounting the pedal bracket to the dash panel can be sufficiently large since the pedal bracket is fixed to the dash panel at two places as described above.

And, there are various directions of components of a force generated in a vehicle due to an actual collision. For example, when not only rearward components but also a lot of lateral components are included, the dash panel is deformed not only in the rearward direction but also in the lateral direction. However, even if the dash panel is deformed in any direction, the pedal bracket and the lever bracket (and the rotation lever) fixed to the dash panel substantially move in the same direction. In other words, a moving direction of the pedal bracket and moving directions of the lever bracket and the rotation lever do not greatly differ from each other when the dash panel is deformed. Accordingly, even when the dash panel is deformed in different directions due to the collision, a twist is prevented from being generated in the fixing part (fixing means) between the pedal bracket and the lever bracket. Therefore, even if the dash panel is deformed in any direction, the pedal bracket can be separated from the lever bracket. In other words, the pedal can be relatively moved to a front side with respect to the dash panel regardless of the deformation direction of the dash panel.

SUMMARY

According to an aspect of the embodiments, a vehicle operation pedal device includes: an operation pedal provided with a boss at an upper end part and further provided with a depressing part at a lower end part, the depressing part being configured to be depressed in a direction towards a vehicle front side; a pair of upper support members fixed to a first vehicle component member disposed on the vehicle front side relative to the operation pedal, the pair of upper support members being configured to receive a load acting on the boss at both sides of the operation pedal at a stepping operation in a vehicle width direction when the depressing part of the operation pedal is depressed in the direction towards the vehicle front side in a non-collision state; a pair of lower support members fixed to the first vehicle component member and further fixed to the pair of upper support members at a welding spot on a vehicle lower side relative to the boss of the operation pedal at the both sides of the operation pedal in the vehicle width direction by spot welding, the pair of lower support members being configured to rotatably support the boss of the operation pedal while receiving the load acting on the boss at the both sides of the operation pedal in the vehicle width direction; an upper center support member laid between upper end parts of the pair of upper support members; and a support part pivotably supporting a tip part of an operating rod protruded toward a vehicle rear side from the first vehicle component member with respect to the operation pedal between the upper end part and the lower end part of the operation pedal, wherein: the upper center support member include a sliding receiving part configured to face a sliding surface of a second vehicle component disposed on the vehicle rear side relative to the first vehicle component member, the sliding surface extending in a direction toward the vehicle rear side so as to be inclined toward the vehicle lower side, the welding spot is positioned on an action line of a reaction force received when the sliding receiving part of the upper center support member abuts on the sliding surface of the second vehicle component member in a case where the first vehicle component member is displaced toward the vehicle rear side at a time of vehicle collision, the pair of lower support members include: a first weakened part provided between the boss of the operation pedal and the welding spot, where tensile deformation is easily generated within the pair of lower support members; and a second weakened part provided adjacent to the welding spot on the vehicle front side, where buckling deformation is easily generated within the pair of lower support members, the pair of upper support members include an escape hole that is configured to guide movement of the boss of the operation pedal toward the vehicle rear side in response to the buckling deformation of the second weakened part of the pair of lower support members and the tensile deformation of the first weakened part of the pair of lower support members after the sliding receiving part of the upper center support member is guided by sliding on the sliding surface of the second vehicle component member when the first vehicle component member is displaced toward the vehicle rear side at the time of vehicle collision, and the boss of the operation pedal is configured to pivot toward the vehicle lower side around the support part while moving to the vehicle rear side when the first vehicle component member is displaced toward the vehicle rear side at the time of vehicle collision.

The object and advantages of the invention will be realized and attained by means of the elements and combinations particularly pointed out in the claims.

It is to be understood that both the forgoing general description and the following detailed description are exemplary and explanatory and are not restrictive of the invention.

DESCRIPTION OF EMBODIMENTS

Figure 1:
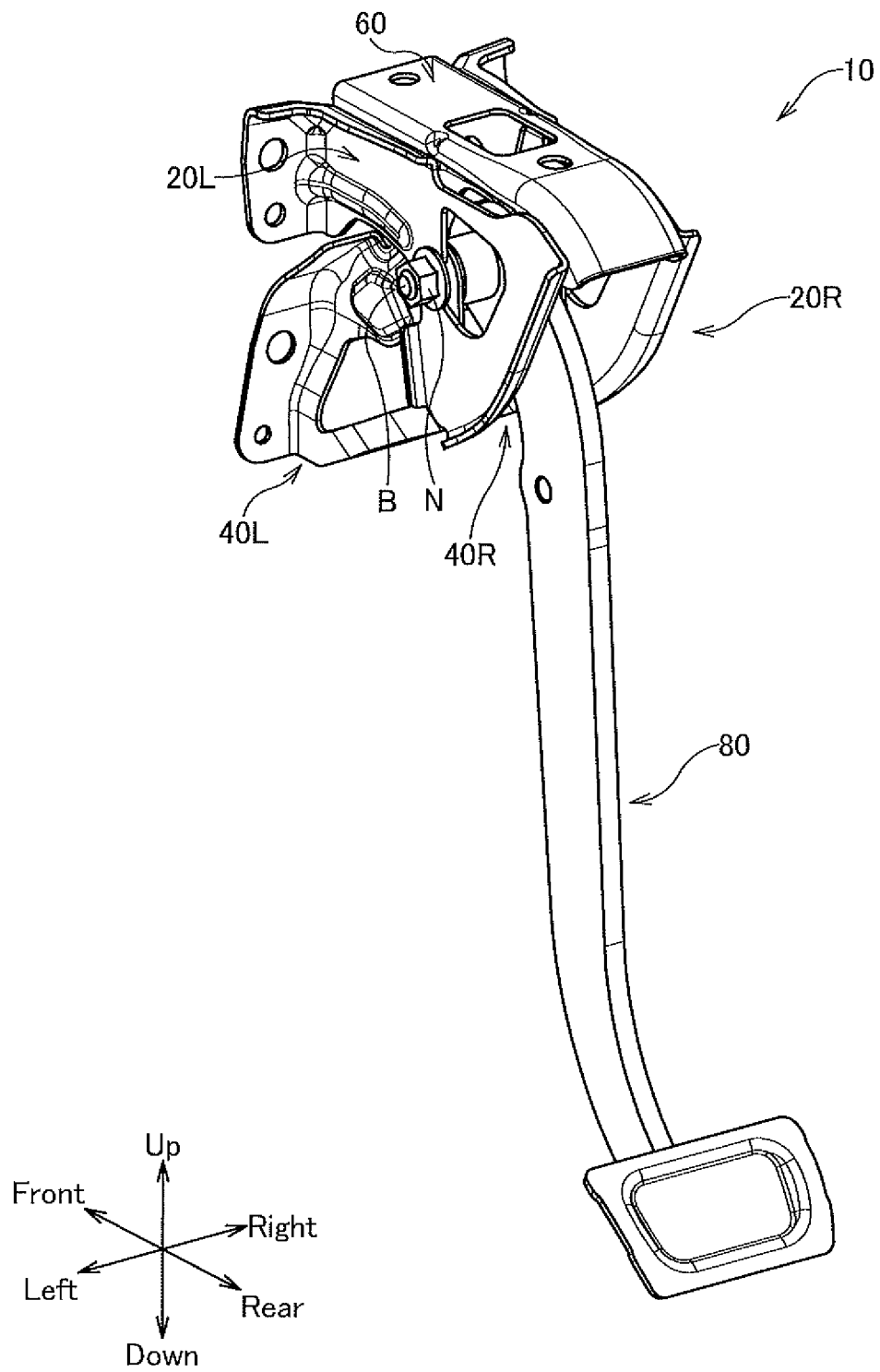
FIG. 1 is a perspective view illustrating a configuration of a vehicle operation pedal device according to a present embodiment.

In an above-mentioned conventional technique, a lot of parts are needful to separate the pedal bracket from the lever bracket, and further it is needful to secure a large mounting space in a vehicle vertical direction since those parts are arranged on an upper side of the pedal bracket.

The present disclosure is made in order to solve the above-mentioned respect in the conventional technique, and a problem thereof is to provide a vehicle operation pedal device, wherein mounting to a vehicle is completed by being fixed to a first vehicle component member disposed on a vehicle front side relative to an operation pedal, and wherein the number of parts needful to prevent a depressing part of the operation pedal from moving rearward at a time of vehicle collision are small, and a mounting space in a vehicle vertical direction is small.

Hereinafter, a vehicle operation pedal device according to the present disclosure will be described based on the concreted present embodiment with reference to the drawings.

In each of the drawings used for an explanation below, a part of the basic configuration is omitted, and a dimensional ratio etc. of each part illustrated in the drawings is not necessarily accurate.

In each drawing, a front-and-rear direction, an up-and-down direction, and a left-and-right direction are as described in the each drawing. However, in FIG. 4, a back side of a paper surface in the drawing is the front direction while a front side of the paper surface in the drawing is the rear direction. In FIGS. 5 to 9, a back side of a paper surface in the each drawing is the right direction while a front side of the paper surface in the each drawing is the left direction.

Incidentally, in the below explanation, the front direction, the rear direction, the upward direction, and the downward direction may be referred to as "the vehicle front side", "the vehicle rear side", "the vehicle upper side", and "the vehicle lower side", respectively. And, the left-and-right direction may be referred to as "the both sides in the vehicle width direction".

(1) Outline of the Vehicle Operation Pedal Device

As illustrated in FIG. 1, a vehicle operation pedal device 10 according to the present embodiment is made of a metal, and includes a pair of upper support members 20L, 20R, a pair of lower support members 40L, 40R, an upper center support member 60, and an operation pedal 80. The operation pedal 80 has an upper end part pivotably supported by a bolt B and a nut N.

Incidentally, in the below explanation below, when the pair of upper support members 20L, 20R is generally explained without differentiation, it is referred to as "an upper support member 20". In this regard, the above is also applied to the pair of lower support members 40L, 40R.

Figure 2:
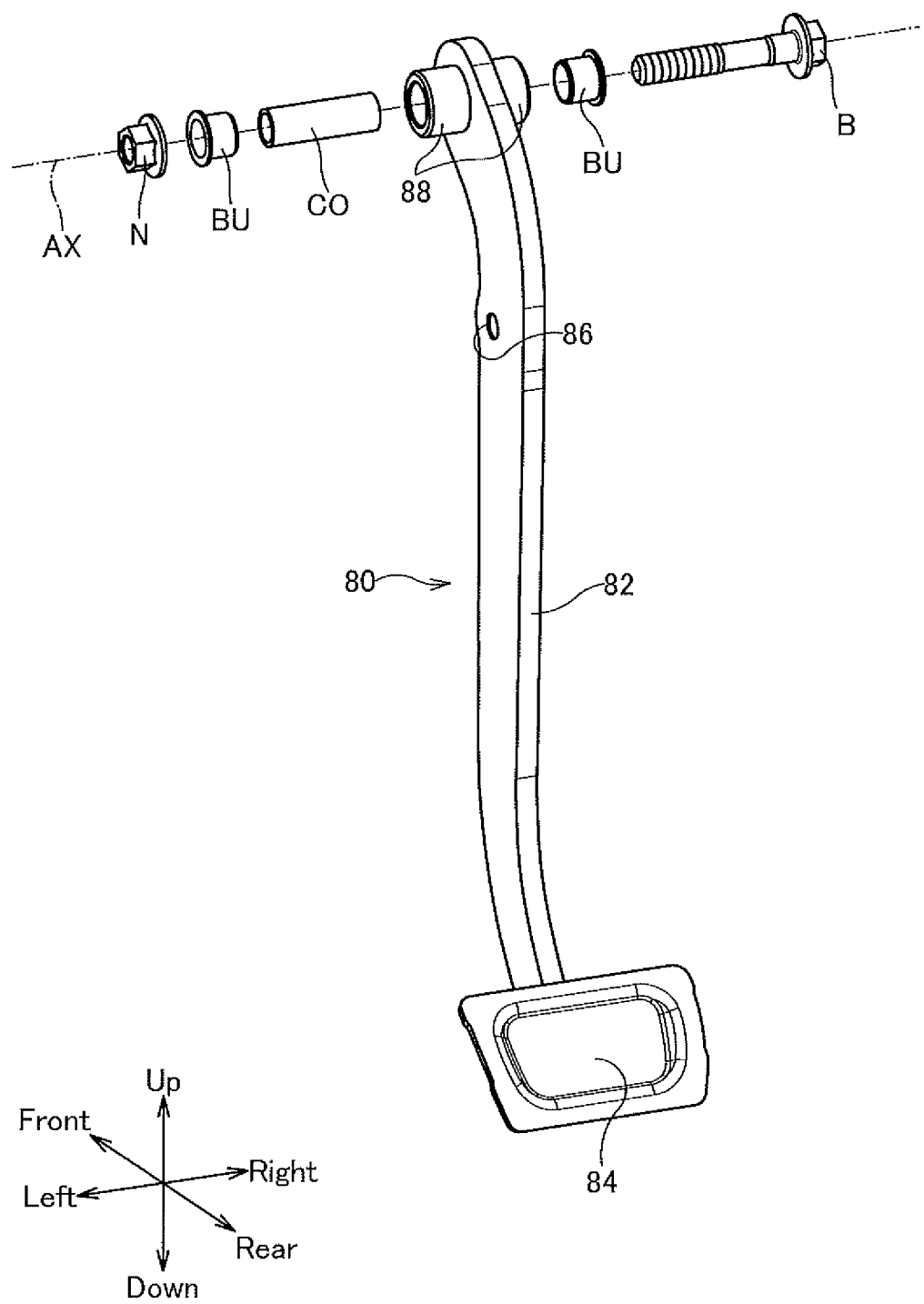
FIG. 2 is an exploded perspective view illustrating a part of the vehicle operation pedal device.

As illustrated in FIG. 2, the operation pedal 80 includes a pedal arm 82. A depressing part 84 is provided at a lower end part of the pedal arm 82. Between an upper end part and the lower end part of the pedal arm 82, a connection hole 86 is provided in a state of passing through the pedal arm 82 in the left-and-right direction. At the upper end part of the pedal arm 82, a boss 88 is fixed to the pedal arm 82 by welding in a state of passing through the pedal arm 82 in the left-and-right direction. Although the pedal arm 82 is a thick plate structure, it may be a thin plate hollow structure. And, the pedal arm 82 may be made of resin.

Figure 3:
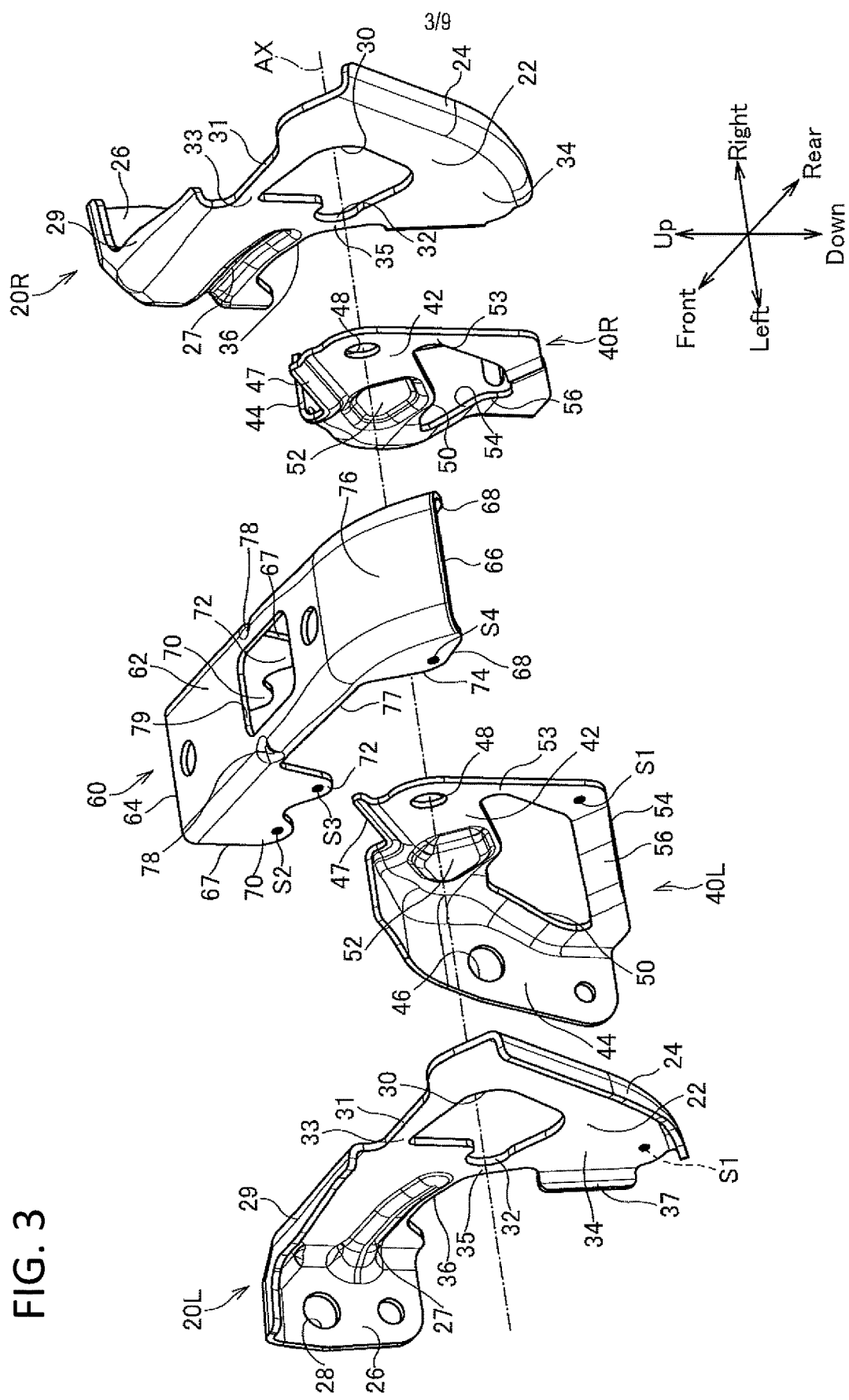
FIG. 3 is an exploded perspective view illustrating a part of the vehicle operation pedal device.

A collar CO is inserted into the boss 88 of the operation pedal 80 that is in a state into which a pair of bushes BU is fitted from left and right ends thereof. Thereby, a cylindrical part of the each bush BU is provided between the boss 88 and the collar CO. The boss 88 in a state as described above is rotatably supported by the bolt B and the nut N with respect to the pair of upper support members 20L, 20R and the pair of lower support members 40L, 40R as described later. Thereby, the boss 88 (provided at the upper end part of the operation pedal 80) rotates with an axis AX as a rotation axis. Incidentally, as illustrated in FIG. 3, the axis AX is positioned on a lower side relative to the upper center support member 60.

Next, the pair of upper support members 20L, 20R will be explained. As illustrated in FIG. 3, the pair of upper support members 20L, 20R, the upper support member 20L on the left side is arranged on a left side (i.e. on an outside) of the upper center support member 60, while the upper support member 20R on the right side is arranged on a right side (i.e. on the outside) of the upper center support member 60. Further, the pair of upper support members 20L, 20R has a symmetrical outer shape in the left-and-right direction.

Therefor, the upper support member 20L on the left side will be explained below, and the detailed explanation on the upper support member 20R on the right side will be omitted by giving the same reference signs parts substantially in common with those of the upper support member 20L on the left side.

The upper support member 20L includes a plate-shaped body 22. A rear end part of the body 22 is formed with a first flange part 24 protruding toward the left direction side (i.e. to an outside). A front end part of the body 22 is formed with a mounting part 26 bent toward the left direction side (i.e. to the outside). A mounting hole 28 is provided at a substantial center of the mounting part 26 in a state where the mounting hole 28 penetrates through the mounting part 26 in the front-and-rear direction. And, the body 22 is provided with an escape hole 30 near a rear side of the body 22 in a state where the escape hole 30 penetrates through the body 22 in the left-and-right direction. An embayment part 32 having a part of a peripheral edge of the escape hole 30 curved into the downward direction is formed at a front peripheral edge of the escape hole 30. Thereby, the escape hole 30 is formed into a substantial L shape when viewed from the left-and-right direction. Further, the rear end part of the body 22 is formed with a protrusion part 34 having a lower edge of the body 22 protruded toward the downward direction. And, a first curved part 36 having the lower edge of the body 22 curved into the upward direction is formed between the mounting part 26 and the protrusion part 34. Incidentally, the protrusion part 34 is spot-welded to the lower support member 40L on the left side at a spot welding point S1.

At the body 22, a first bead part 27 protruding toward the left direction side (i.e. to the outside) is provided from the mounting part 26 to an upper side of the first curved part 36. At an upper end part of the body 22, a second flange part 29 projecting toward the left direction side (i.e. to the outside) is formed from the mounting part 26 to the center of the body 22. A second curved part 31 having an upper edge of the body 22 curved into the downward direction is formed between the second flange part 29 and the first flange part 24. A first thin part 33 is provided between the second curved part 31 and the escape hole 30. The first thin part 33 is formed with a lower edge of the second curved part 31 and an upper peripheral edge of the escape hole 30, and a length in the up-and-down direction is shorter than that in the front-and-rear direction. And, a second thin part 35 is formed between the escape hole 30 and the first curved part 36. The second thin part 35 is formed with a peripheral edge of the embayment part 32 of the escape hole 30 and an edge of the first curved part 36, and a length in the front-and-rear direction is shorter than that in the up-and-down direction. And, at a lower end part of the body 22, a third flange part 37 projecting toward the left direction side (i.e. to the outside) is formed between the first curved part 36 and the first flange part 24.

Next, the pair of lower support members 40L, 40R will be explained below. OF the pair of lower support members 40L, 40R, the lower support member 40L on the left side is arranged on a right side of the upper support member 20L (i.e. on an inside) while the lower support member 40R on the right side is arranged on a left side of the upper support member 20R (i.e. on an inside). Further, the pair of lower support members 40L, 40R has a symmetrical outer shape in the left-and-right direction.

Therefor, the lower support member 40L on the left side will be explained below, and the detailed explanation on the lower support member 40R on the right side will be omitted by giving the same reference signs parts substantially in common with those of the lower support member 40L on the left side.

The lower support member 40L includes a plate-shaped body 42. A mounting part 44 having an end part of the body 42 bent in the left direction (i.e. to an outside) is formed from a center at an upper end part to a front end part of the body 42. A mounting hole 46 is provided at a substantial center of the mounting part 44 in a state where the mounting hole 46 penetrates through the mounting part 44 in the front-and-rear direction. A rotation hole 48 is provided at a rear end part of the body 42 in a state where the rotation hole 48 penetrates through the body 42 in the left-and-right direction. An opening part 50 is provided at a substantial center of the body 42 in a state where the opening part 50 penetrates through the body 42 in the left-and-right direction. Further, at the body 42, a second bead part 52 protruding toward the left direction side (i.e. to the outside) is provided on the upper side relative to the opening part 50. And, the body 42 is provided with an elongated part 54 formed with a lower peripheral edge of the opening part 50 and a lower edge of the body 42. The elongated part 54 has a shape of a length in the up-and-down direction shorter than a length in the front-and-rear direction.

At the upper end part of the body 42, a stepped-shaped shelf part 47 is formed from the mounting part 44 to the rear end part. And at the body 42, a third thin part 53 is provided on a lower side relative to the rotation hole 48. The third thin part 53 is formed with a rear peripheral edge of the opening part 50 and a rear edge of the body 42. And, the third thin part 53 has a length in the front-and-rear direction shorter than that in the up-and-down direction, and further has a constricted shape where the length in the front-and-rear direction is the shortest near an upper part of the rear peripheral edge of the opening part 50.

Incidentally, plate thickness of the body 42 of the pair of lower support members 40L, 40R is thinner than thickness of the body 22 of the pair of upper support members 20L, 20R.

Next, the upper center support member 60 will be explained below. The upper center support member 60 includes a plate-shaped body 62. On left and right sides of the body 62, first bent parts 67, 67 are formed by bending an end part of the body 62 on a front end 64 side to the downward direction and second bent parts 68, 68 are formed by bending an end part of the body 62 on a rear end 66 side to the downward direction. Two protrusion parts 70, 72 having a lower edge of the first bent part 67 protruded toward the downward direction are formed at the first bent part 67 on the left side. Further, a protrusion part 74 having a lower edge of the second bent part 68 protruded toward the downward direction is formed at the second bent part 68 on the left side. Each of the protrusion parts 70, 72, 74 is spot-welded to an upper end part of the upper support member 20L on the left side at each of spot welding points S2, S3, and S4. In this regard, the above is also applied to the first bent part 67 and the second bent part 68 on the right side, the first bent part 67 and the second bent part 68 on the right side are spot-welded to an upper end part of the upper support member 20R on the right side. Thereby, the upper center support member 60 is laid between the upper end parts of the pair of upper support members 20L, 20R. Further, the body 62 is formed with a sliding receiving part 76 from a substantial center to the rear end 66 of the body 62. The sliding receiving part 76 is an inclined surface bent downward as it goes rearward.

On the left and right sides of the body 62, a curved part 77 having a lower edge of the end part of the body 62 curved into the upward direction is formed between the first bent part 67 and the second bent part 68. Triangular bead parts 78, 78 are formed near an upper side of a front edge of the curved part 77 (i.e. near an upper side of a rear edge of the first bent part 67) at corner parts of the body 62 on the left and right sides. At the body 62, an upper opening part 79 is provided between the triangular bead parts 78, 78 in a state where the upper opening 79 penetrates through the body 62 in the up-and-down direction.

As described above, the pair of upper support members 20L, 20R, the pair of lower support members 40L, 40R, and the upper center support member 60 are integrated by the spot-welding at the each of the spot welding points S2, S3, and S4.

At the time of integration, the spot welding point S1 is positioned in the left-and-right direction of the operation pedal 80. Thereby, the each of lower support members 40L, 40R is fixed to the each of upper support members 20L, 20R in the left-and-right direction of the operation pedal 80. Incidentally, the spot welding point S1 is at a position adjacent to the elongated part 54 from the upper center support member 60 side (i.e. an upper side) in the each of lower support members 40L, 40R.

And, an upper surface of the body 62 of the upper center support member 60 (including the sliding receiving part 76) is arranged in the up direction relative to an upper end of the each of upper support members 20L, 20R. And, the front end 64 of the upper center support member 60 is arranged close to the mounting part 26 in the rear direction relative to the mounting part 26 of the each of upper support members 20L, 20R.

Further, the embayment part 32 of the escape hole 30 of the each of upper support members 20L, 20R is adjacent to the rotation hole 48 of the each of lower support members 40L, 40R inside thereof. Accordingly, when the boss 88 of the operation pedal 80 is interposed between the rotation holes 48 of the each of lower support members 40L, 40R, the embayment parts 32 of the escape holes 30 of the each of upper support members 20L, 20R and the rotation holes 48 of the each of lower support members 40L, 40R are in a state of being communicated with each other in the left-and-right direction via the collar CO inside the boss 88. In a situation as described above, the bolt B is inserted to the embayment part 32 of the upper support member 20L on the left side from the embayment part 32 of the upper support member 20R on the right side via the rotation hole 48 of the lower support member 40R on the right side, the collar CO inside the boss 88, and the rotation hole 48 of the lower support member 40L on the left side.

Figure 4:
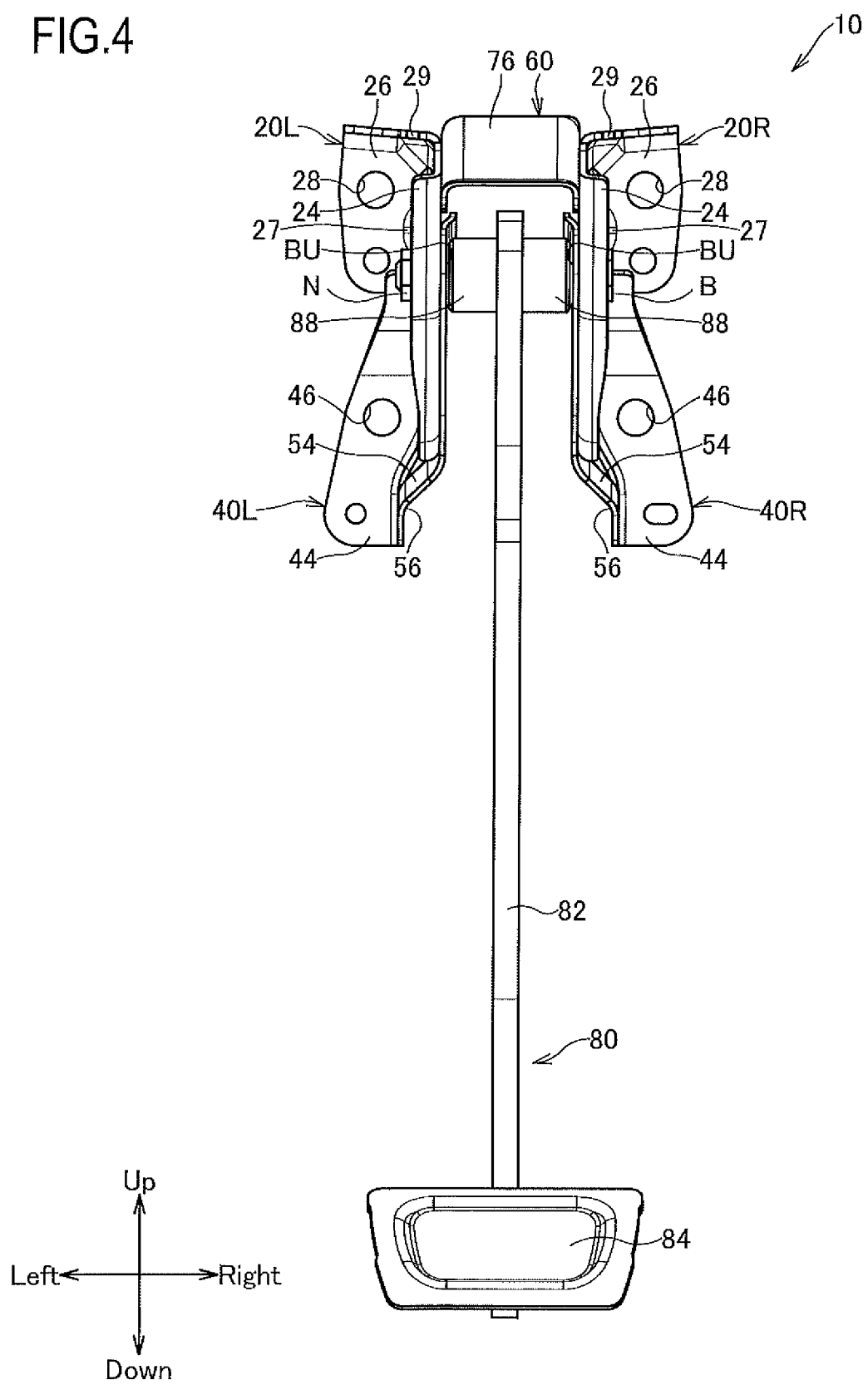
FIG. 4 is a front view illustrating the configuration of the vehicle operation pedal device.

And then, as illustrated in FIG. 4, a head part of the bolt B is abutted with the upper support member 20R on the right side. In contrast, in the upper support member 20L on the left side, a tip part of the bolt B is protruded in the left direction, and the nut N is screwed into the protruded part. Thereby, since left and right ends of the collar CO are sandwiched between the each of lower support members 40L, 40R, a distance between (the rotation holes 48 of) the each of lower support members 40L, 40R in the left-and-right direction is kept fixed. Further, a circular flange part of the each bush BU is provided between the boss 88 and the each of the lower support members 40L, 40R, at the left and right ends of the boss 88.

As described above, the boss 88 at the upper end part of the pedal arm 82 is rotatably supported in (the rotation holes 48 of) the each of lower support members 40L, 40R, and the operation pedal 80 is pivoted around the collar CO and the bolt B when the depressing part 84 at the lower end part of the pedal arm 82 is stepped on to the front direction. At the time of the rotation, the boss 88 of the operation pedal 80 is held by the embayment parts 32 of the escape holes 30 of the each of upper support members 20L, 20R via the bolt B and the nut N.

Incidentally, the lower support member 40L is formed in a round part 56 having a curved surface on which the elongated part 54 is protruded in the left direction side (i.e. outside). Likewise, the lower support member 40R is formed in the round part 56 having a curved surface on which the elongated part 54 is protruded in the right direction side (i.e. outside). The round parts 56, 56 are provided closer to the front direction side from the center of the elongated parts 54, 54 in the longitudinal direction (i.e. up-and-down direction) of the elongated parts 54, 54.

(2) Fixation of the Vehicle Operation Pedal Device

Figure 5:
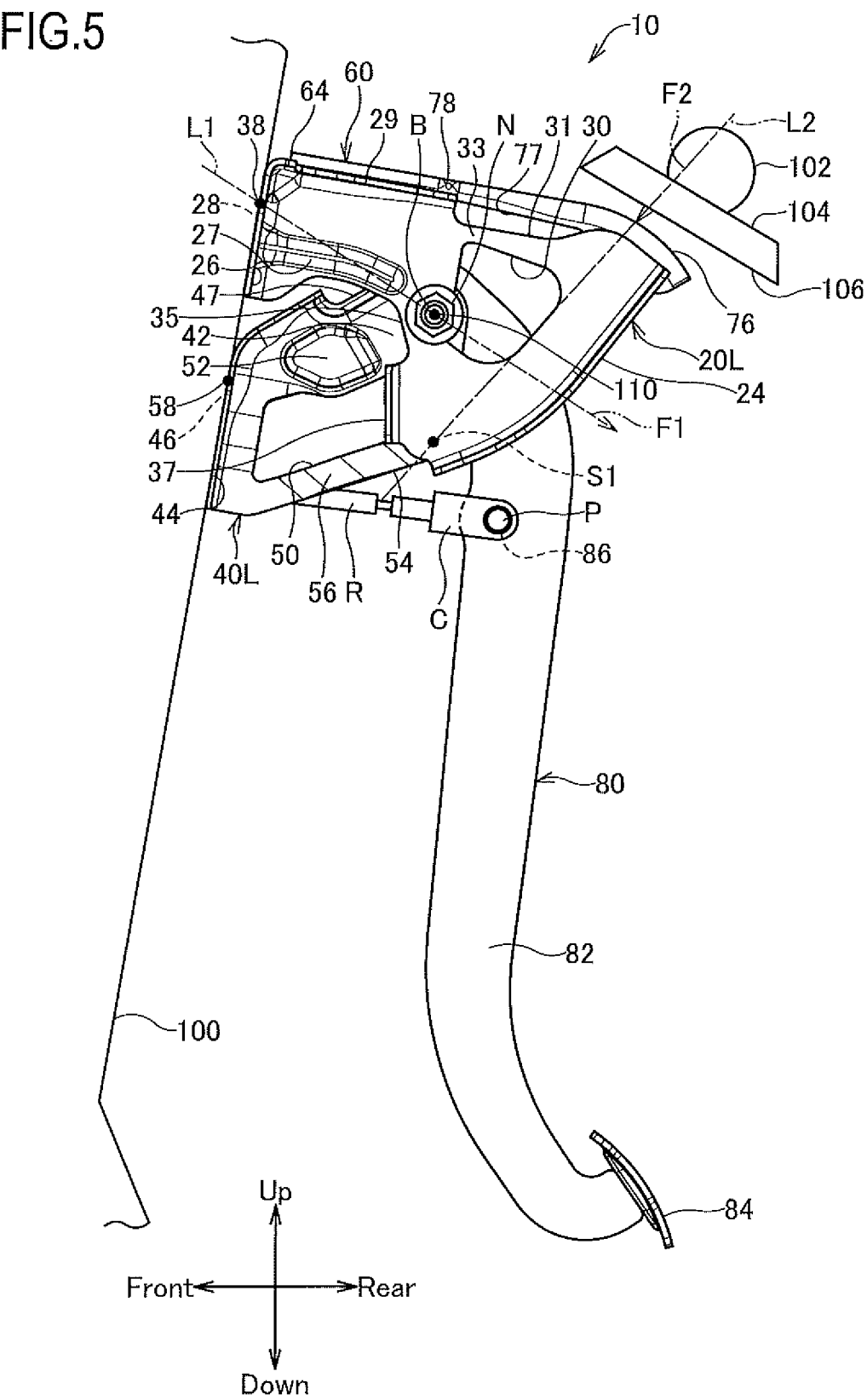
FIG. 5 is a side view illustrating the configuration of the vehicle operation pedal device at a normal time.
Figure 6:
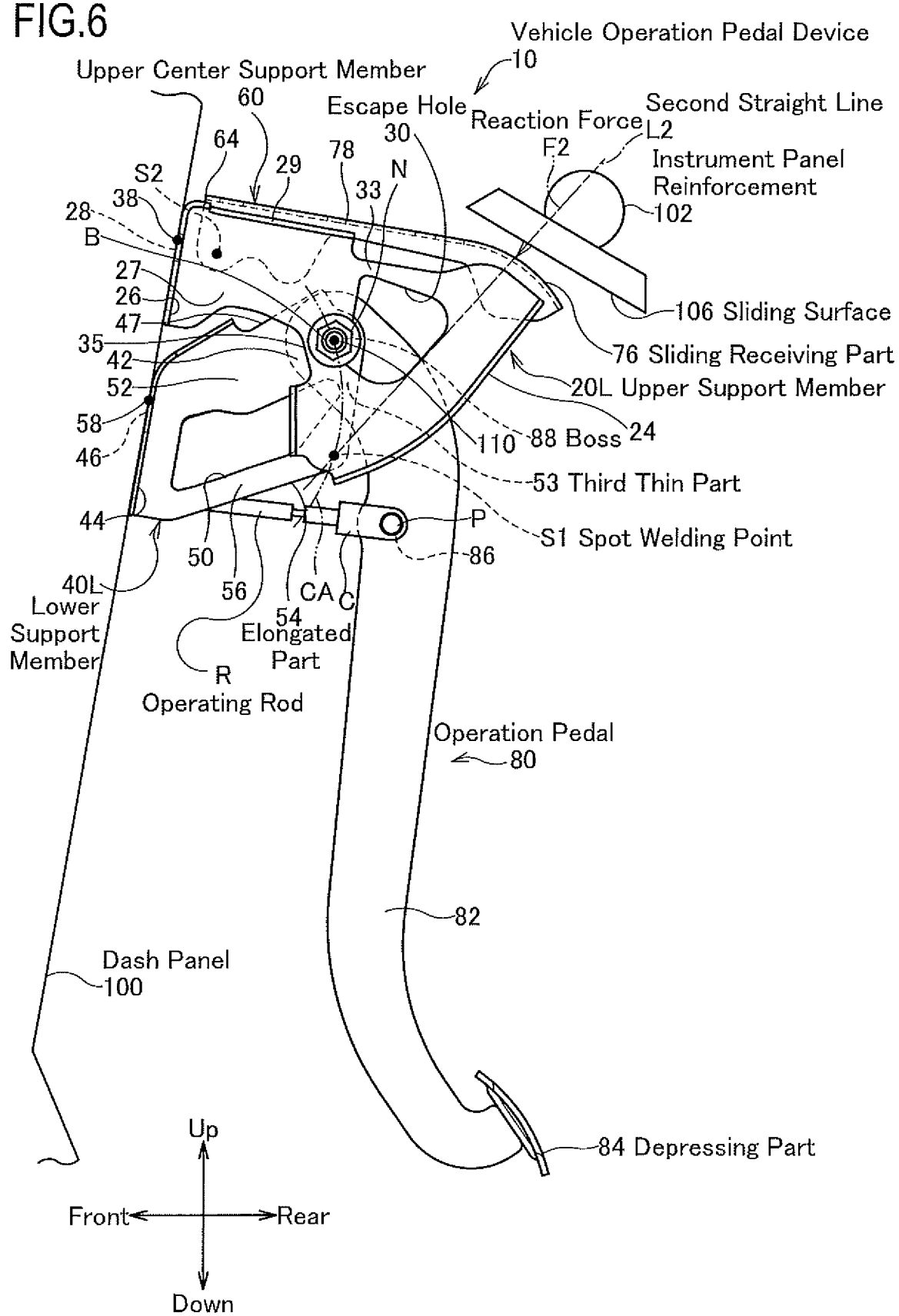
FIG. 6 is a side view illustrating the configuration of the vehicle operation pedal device at the normal time.

As illustrated in FIGS. 5 and 6, the vehicle operation pedal device 10 according to the present embodiment is fixed to a dash panel 100. In order to fix the vehicle operation pedal device 10 to the dash panel 100, the mounting part 26 of the upper support member 20 is in a state of being abutted with the dash panel 100, and a fixing bolt (not illustrated) is inserted into the mounting hole 28 of the mounting part 26. Hereinafter, the inserted position is referred to as an upper fixed point 38. Further, the mounting part 44 of the lower support member 40 is in a state of being abutted with the dash panel 100, and a fixing bolt (not illustrated) is inserted into the mounting hole 46 of the mounting part 44. Hereinafter, the inserted position is referred to as a lower fixed point 58. Incidentally, in FIG. 6, lines etc. indicating the first bead part 27, the second bead part 52, and the triangular bead part 78 are omitted. In this regard, the above is also applied to FIGS. 7 to 9 described later.

As described above, the upper support member 20 and the lower support member 40 are fastened to the dash panel 100 by a bolt. At that time, on a rear side relative to the dash panel 100, the front end 64 of the upper center support member 60 is disposed adjacent to the dash panel 100. Incidentally, the upper support member 20 and the lower support member 40 may be fastened to the dash panel 100 by a bolt via a collar to absorb vibration sound etc.

The dash panel 100 corresponds to a part of a vehicle and is disposed in the front direction relative to the operation pedal 80. The vehicle includes an instrument panel reinforcement 102 and a bracket for collision 104 etc. in addition to the dash panel 100. The instrument panel reinforcement 102 is disposed to the vehicle rear side relative to the dash panel 100. The bracket for collision 104 is fixed from a front end part to a lower end part of the instrument panel reinforcement 102. A sliding surface 106 is formed at a front end of the bracket for collision 104. The sliding surface 106 is inclined to the vehicle lower side as it goes toward the vehicle rear side and faces the sliding receiving part 76 of the upper center support member 60.

A tip part of an operating rod R is pivotably supported to the operation pedal 80 via a connection pin P and a clevis C between the upper end part and a lower end part of the operation pedal 80. The operating rod R is protruded from a master cylinder (not illustrated) on the dash panel 100 side to the rear direction. Incidentally, the connection pin P is attached by inserting into the connection hole 86 of the pedal arm 82 and the clevis C.

When the depressing part 84 of the operation pedal 80 is stepped on to the vehicle front side, a load F1 (see FIG. 5) acts on the bolt B via the boss 88 of the operation pedal 80 (see FIG. 6). And then, the upper fixed point 38 is positioned on a first straight line L1 extended from a start point of a vector indicating the load F1 (i.e. a rotational center point 110 of the bolt B and the nut N) to an opposite side to a direction of the vector. Namely, the first straight line L1 is a line connecting the rotational center point 110 on the bolt B to the upper fixed point 38 when viewed from a vertical direction (i.e. left-and-right direction) to paper surfaces of FIGS. 5 and 6.

Incidentally, the rotational center point 110 on the bolt B (and the nut N) is the same as a rotational center point of the boss 88 etc. of the operation pedal 80. Accordingly, the rotational center point 110 on the bolt B (and the nut N) may be hereinafter referred to as the rotational center point 110 of the boss 88 etc. of the operation pedal 80.

In contrast, when the sliding receiving part 76 of the upper center support member 60 abuts on the sliding surface 106 of the instrument panel reinforcement 102 by displacing the dash panel 100 to the vehicle rear side, a reaction force F2 from the sliding surface 106 of the instrument panel reinforcement 102 acts on the sliding receiving part 76 of the upper center support member 60. The spot welding point S1 is positioned on a second straight line L2 extended to a direction of a vector indicating the reaction force F2 when viewed from the vertical direction (i.e. left-and-right direction) with respect to the paper surfaces of FIGS. 5 and 6.

Incidentally, the direction of the vector indicating the reaction force F2 can be adjusted depending on a distance from the upper end of each of the upper support members 20L, 20R to the upper surface of the body 62 of the upper center support member 60 (including the sliding receiving part 76) when the upper support member 20, the lower support member 40, and the upper center support member 60 are integrated with each other.

And, the lower support member 40 is fixed to the upper support member 20 at the spot welding point S1 adjacent to the elongated part 54 from a side where the sliding receiving part 76 of the upper center support member 60 receives the reaction force F2. The spot welding point S1 is positioned on the lower side relative to the rotational center point 110 of the boss 88 etc. of the operation pedal 80.

Incidentally, the rotational center point 110 on the bolt B (i.e. the rotational center point of the boss 88 etc. of the operation pedal 80) corresponds to a point where the axis AX (see FIG. 2) parallel to the vertical direction (i.e. the left-and-right direction) to the paper surfaces of FIGS. 5 and 6 intersects with a left and right side end surface of the bolt B.

As described in detail above, in the vehicle operation pedal device 10 according to the present embodiment, the pair of upper support members 20L, 20R and the pair of lower support members 40L, 40R are fixed to the dash panel 100 disposed on the vehicle front side relative to the operation pedal 80. The upper center support member 60 is laid between the upper end parts of the pair of upper support members 20L, 20R. On the both sides of the operation pedal 80 in the vehicle width direction, the pair of lower support members 40L, 40R is fixed to the pair of upper support members 20L, 20R by the spot welding point S1 positioned on the lower side relative to the rotational center point 110 of the boss 88 etc. of the operation pedal 80. Further, at the pair of lower support members 40L, 40R, the boss 88 provided at the upper end part of the pedal arm 82 of the operation pedal 80 is rotatably supported to suspend the depressing part 84 provided at the lower end part of the pedal arm 82 of the operation pedal 80. As described above, the vehicle operation pedal device 10 according to the present embodiment is supported by only the dash panel 100 out of members forming a vehicle.

Accordingly, the vehicle operation pedal device 10 according to the present embodiment is fixed to the dash panel 100 disposed on the vehicle front side relative to the operation pedal 80, thereby completing mounting to the vehicle.

After the mounting to the vehicle is completed as described above, the first thin part 33 is arranged between the triangular bead part 78 of the upper center support member 60 and the boss 88 of the operation pedal 80 in the upper support member 20. Further, the second thin part 35 is arranged adjacent to the boss 88 of the operation pedal 80 on the vehicle front side. The first thin part 33 and the second thin part 35 have a lower rigidity than the other parts of the upper support member 20, thereby easily generating (bending) deformation.

In contrast, the third thin part 53 is arranged between the boss 88 of the operation pedal 80 and the spot welding point S1 in the lower support member 40. The third thin part 53, the boss 88 of the operation pedal 80 (more specifically, the rotational center point 110 on the bolt B), and the spot welding point S1 are positioned on a circular arc CA (see FIG. 6) with the lower fixed point 58 as a center. Incidentally, the third thin part 53 and the spot welding point S1 are positioned on the lower side relative to the boss 88 of the operation pedal 80. Further, the elongated part 54 is arranged adjacent to the spot welding point S1 on the vehicle front side. The third thin part 53 and the elongated part 54 have a lower rigidity than the other parts of the lower support member 40, thereby easily generating (bending or buckling) deformation.

And, the first flange part 24 is arranged on the vehicle rear side relative to the first thin part 33 and the second thin part 35 in the upper support member 20. In contrast, the first bead part 27, the second flange part 29, and the spot welding point S2 are arranged on the vehicle front side relative to the first thin part 33 and the second thin part 35. Further, the first bead part 27, the second flange part 29, and the spot welding point S2 are arranged on the vehicle front side relative to the boss 88 of the operation pedal 80.

As a result of the above, the first flange part 24 reinforces the rigidity of a rear end part of the upper support member 20 on which the reaction force F2 acts from the sliding receiving part 76 of the upper center support member 60 (i.e. a part where the sliding receiving part 76 receives the reaction force F2) to the spot welding point S1 in cooperation with the third flange part 37. Further, the first bead part 27, the second flange part 29, and the spot welding point S2 reinforces the rigidity of a front end part of the upper support member 20 on which the load F1 acts (i.e. a vehicle front side part relative to the boss 88 of the operation pedal 80). Accordingly, the spot welding point S2 is positioned adjacent to the mounting part 26 of the upper support member 20 (i.e. the dash panel 100). Incidentally, the first bead part 27, the second flange part 29, and the spot welding point S2 reinforce the rigidity on the vehicle front side relative to the first thin part 33 and the second thin part 35 in the upper support member 20.

In contrast, the shelf part 47 and the second bead part 52 are arranged on the vehicle front side relative to the third thin part 53 in the lower support part 40. Further, the shelf part 47 and the second bead part 52 are arranged on the vehicle front side relative to the boss 88 of the operation pedal 80.

Thereby, the shelf part 47 and the second bead part 52 reinforce the rigidity of a front end part of the lower support member 40 on which the load F1 acts (i.e. the vehicle front side part relative to the boss 88 of the operation pedal 80).

Incidentally, the shelf part 47 and the second bead part 52 reinforce the rigidity on the vehicle front side relative to the third thin part 53 in the lower support member 40.

(3) Operation of the Vehicle Operation Pedal Device at a Stepping Operation

In the vehicle operation pedal device 10 according to the present embodiment, the operation pedal 80 circularly moves to the vehicle front side around the rotational center point 110 (i.e. the rotational center point of the boss 88 of the operation pedal 80) at the stepping operation when the depressing part 84 of the operation pedal 80 is stepped on to the vehicle front side at a normal time. In contrast, when the stepping operation to the operation pedal 80 is released, the operation pedal 80 circularly moves to the vehicle rear side around the rotational center point 110 (i.e. the rotational center point of the boss 88 of the operation pedal 80) by a biasing force of a biasing member (not illustrated).

At that time, the load F1 acting on the bolt B (i.e. the boss 88 of the operation pedal 80) is received by the pair of upper support members 20L, 20R and the pair of lower support members 40L, 40R at the both sides of the operation pedal 80 in the vehicle width direction. Specifically, the load F1 is auxiliarily received by the embayment parts 32 of the escape holes 30 of the upper support member 20. And, the load F1 is mainly received by the rotation holes 48 of the lower support member 40.

Further, in the vehicle operation pedal device 10 according to the present embodiment, as described above, a direction of the first straight line L1 that connects the position where the pair of upper support members 20L, 20R is fixed to the dash panel 100 (i.e. the upper fixed point 38) to the rotational center point 110 on the bolt B (i.e. the rotational center point of the boss 88 etc. of the operation pedal 80) is the same as a direction of the load F1 at the stepping operation. Accordingly, the boss 88 of the operation pedal 80 is efficiently and rotatably supported since at the stepping operation, the load F1 acting on the bolt B (i.e. the boss 88 of the operation pedal 80) does not generate a rotation moment and is received by the pair of upper support members 20L, 20R and the pair of lower support members 40L, 40R. Therefore, in the vehicle operation pedal device 10 according to the present embodiment, each cross section of the pair of upper support members 20L, 20R and the pair of lower support members 40L, 40R to receive the load F1 at the depressing operation is made minimum, thereby being able to reduce the weight and the costs.

Incidentally, when the operating rod R is displaced toward the vehicle front side according to the stepping operation to the operation pedal 80, an operation force at the stepping operation is transmitted to a braking device or a control device to control a driving state of the vehicle through a hydraulic circuit or an electronic circuit etc.

Figure 7:
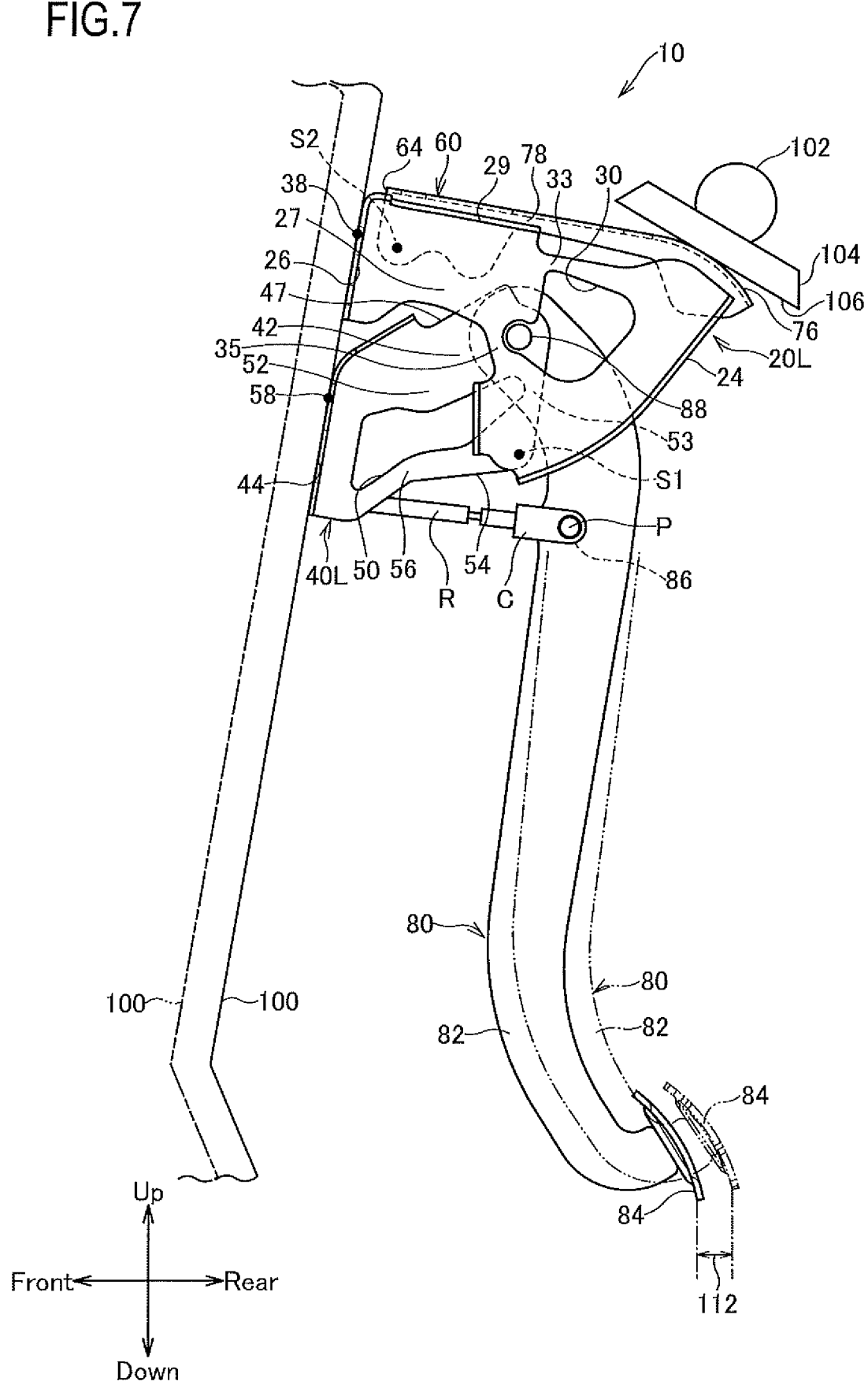
FIG. 7 is a side view illustrating the configuration of the vehicle operation pedal device at a time of vehicle collision.

(4) Operation of the Vehicle Operation Pedal Device at a Time of Vehicle Collision As illustrated in FIG. 7, in the vehicle operation pedal device 10 according to the present embodiment, when the dash panel 100 is displaced toward the vehicle rear side at the time of vehicle collision, the sliding receiving part 76 of the upper center support member 60 may be abutted on the sliding surface 106 of the instrument panel reinforcement 102 disposed on the vehicle rear side relative to the dash panel 100.

Figure 8:
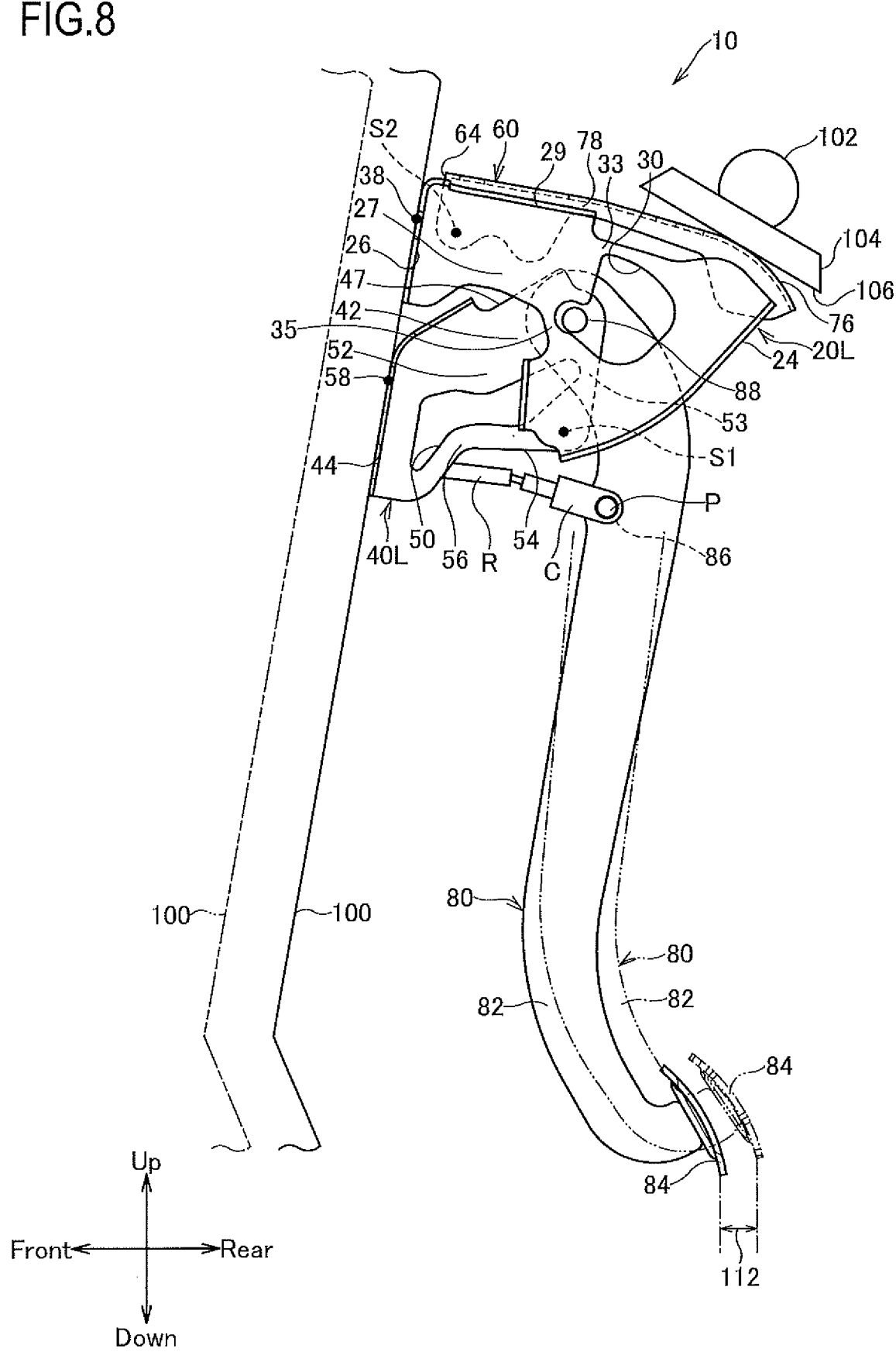
FIG. 8 is a side view illustrating the configuration of the vehicle operation pedal device at the time of vehicle collision.

In that case, as illustrated in FIGS. 7 and 8, the sliding receiving part 76 of the upper center support member 60 slides on the sliding surface 106 of the instrument panel reinforcement 102 to be guided to the vehicle lower side as it goes toward the vehicle rear side. The reaction force F2 (see FIGS. 5 and 6) when the sliding receiving part 76 abuts on the sliding surface 106 acts in the direction of the vector indicating the reaction force F2 with respect to the spot welding point S1 on the second straight line L2 (see FIGS. 5 and 6). Accordingly, the triangular bead part 78, the first thin part 33, and the second thin part 35 are bent in the upper center support member 60 and the upper support member 20. At the same time, in the lower support member 40, the elongated part 54 is deformed by buckling so as to be pushed/contracted due to the spot welding point S1 while the third thin part 53 is tensile deformed so as to be stretched out by the spot welding point S1. In response to the above, the boss 88 of the operation pedal 80 rotatably supported by the rotation holes 48 of the pair of lower support members 40L, 40R is guided to the vehicle rear side from the embayment parts 32 inside the escape holes 30 of the pair of upper support members 20L, 20R.

Incidentally, the third thin part 53 and the spot welding point S1 are positioned on the lower side relative to the boss 88 of the operation pedal 80. Accordingly, the boss 88 of the operation pedal 80 is guided to the vehicle rear side from the embayment parts 32 within the escape holes 30 of the pair of upper support members 20L, 20R in response to the tensile deformation of the third thin part 53 from the beginning of the above abuttal.

From the above, the boss 88 of the operation pedal 80, while moving toward the vehicle rear side, pivots toward the vehicle lower side by the rotation moment in which a center is the connection pin P rotatably supporting the tip part of the operating rod R with respect to the operation pedal 80. Thereby, the depressing part 84 of the operation pedal 80 moves toward the vehicle front side. Accordingly, the depressing part 84 of the operation pedal 80 moves to, for instance, a position an advancing distance 112 away toward the vehicle front side from a state where the depressing operation is released (i.e. a state of the depressing part 84 of the operation pedal 80 indicated by a two-dot chain line). Thereby, the depressing part 84 of the operation pedal 80 is prevented from moving rearward at the time of vehicle collision.

As described above, in the vehicle operation pedal device 10 according to the present embodiment, the depressing part 84 of the operation pedal 80 is stably prevented from moving rearward at the time of vehicle collision with a simple structure, and further the operation pedal 80 positively pivots at the stepping operation as described above. Therefore, in the vehicle operation pedal device 10 according to the present embodiment, the number of parts needful to prevent the depressing part 84 of the operation pedal 80 from moving rearward at the time of vehicle collision are small, and a space-saving is achieved since a mounting space in a vehicle vertical direction is small. Accordingly, the vehicle operation pedal device 10 according to the present embodiment can further reduce the weight and costs, and thus the case where a mounting space is insufficient due to a vehicle design is decreased.

And, in the vehicle operation pedal device 10 according to the present embodiment, the boss 88 of the operation pedal 80, the third thin part 53, and the spot welding point S1 are positioned on the circular arc CA with the lower fixed point 58 as a center. Accordingly, since a force to tensile deform the third thin part 53 acts in a tangential direction of the circular arc CA, the force efficiently transmits to the boss 88 of the operation pedal 80 through the third thin part 53 from the spot welding point S1. Therefore, the boss 88 of the operation pedal 80 is smoothly led to the vehicle rear side from the embayment parts 32 within the escape holes 30 of the pair of upper support members 20L, 20R.

And, in the vehicle operation pedal device 10 according to the present embodiment, the rear end parts of the pair of upper support members 20L, 20R have such a degree of strength that is not deformed with the reaction force F2 received by the sliding receiving part 76 of the upper center support member 60 at the time of vehicle collision by reinforcing the rigidity with the first flange part 24 etc. on the vehicle rear side relative to the first thin part 33 and the second thin part 35. In contrast, the first thin part 33 and the second thin part 35 have the lower rigidity in the pair of upper support members 20L, 20R. Thereby, the reaction force F2 received by the sliding receiving part 76 of the upper center support member 60 efficiently transmits to the spot welding point S1 through the rear end part of the pair of upper support members 20L, 20R at the time of vehicle collision. Further, the upper center support member 60 bends with the triangular bead part 78 as a starting point, and simultaneously, the pair of upper support members 20L, 20R smoothly bends at the first thin part 33 and the second thin part 35.

Thus, the third thin part 53 of the pair of lower support members 40L, 40R is smoothly tensile deformed by the spot welding point S1 in response to the bend of the pair of upper support members 20L, 20R. Further, a force acting on the instrument panel reinforcement 102 at the time of vehicle collision can be suppressed since the reaction force F2 received by the sliding receiving part 76 of the upper center support member 60 does not become larger.

And, in the vehicle operation pedal device 10 according to the present embodiment, the rigidity on the vehicle front side relative to the boss 88 of the operation pedal 80 is reinforced by the first bead part 27, the second flange part 29, and the spot welding point S1 in the pair of upper support members 20L, 20R. Further, the rigidity on the vehicle front side relative to the boss 88 of the operation pedal 80 is reinforced by the shelf part 47 and the second bead part 52 in the pair of lower support members 40L, 40R. Thereby, since the pair of upper support members 20L, 20R and the pair of lower support members 40L, 40R have such a degree of strength that is not deformed with the load F1 acting on the bolt B, the stepping operation when the depressing part 84 of the operation pedal 80 is stepped on to the vehicle front side at a normal time is not adversely affected even if provided are the first thin part 33, the second thin part 35, the third thin part 53, and the elongated part 54 which are deformed at the time of vehicle collision.

And, in the vehicle operation pedal device 10 according to the present embodiment, the vehicle front side relative to the first thin part 33 and the second thin part 35 in the pair of upper support members 20L, 20R has such a degree of strength that is not deformed with the reaction force F2 received by the sliding receiving part 76 of the upper center support member 60 at the time of vehicle collision by reinforcing the rigidity with the first bead part 27, the second flange part 29, and the spot welding point S2. Accordingly, even if the sliding receiving part 76 of the upper center support member 60 receives the reaction force F2 at the time of vehicle collision, the vehicle front side relative to the first thin part 33 and the second thin part 35 is hardly deformed in the pair of upper support members 20L, 20R. Therefore, at the time of vehicle collision, the upper center support member 60 bends with the triangular bead part 78 as a starting point, and simultaneously, the pair of upper support members 20L, 20R more smoothly bends at the first thin part 33 and the second thin part 35. Further, the vehicle front side relative to the third thin part 53 of the pair of lower support members 40L, 40R has such a degree of strength that is not deformed with the reaction force F2 received by the sliding receiving part 76 of the upper center support member 60 at the time of vehicle collision by reinforcing the rigidity with the shelf part 47 and the second bead part 52. Accordingly, even if the sliding receiving part 76 of the upper center support member 60 receives the reaction force F2 at the time of vehicle collision, the vehicle front side relative to the third thin part 53 is hardly deformed in the pair of lower support members 40L, 40R. Therefore, the pair of lower support members 40L, 40R smoothly bends at the third thin part 53 at the time of vehicle collision.

And, in the vehicle operation pedal device 10 according to the present embodiment, the round part 56 having the curved surface on which the elongated part 54 is protruded outside is formed in the pair of lower support members 40L, 40R. Further, the round part 56 is provided closer to the front direction side from the center of the elongated part 54 in the longitudinal direction (i.e. front-and-rear direction in FIGS. 5 to 9) of the elongated part 54. Accordingly, when the elongated part 54 is deformed by buckling due to the spot welding point S1 positioned on a rear side of the elongated part 54, the elongated part 54 is deformed by buckling due to the round part 56 while opening toward the outside of the pair of lower support members 40L, 40R. Thus, even if the elongated part 54 is deformed by buckling, the elongated part 54 does not contact the operating rod R etc. provided inside the pair of lower support members 40L, 40R.

Figure 9:
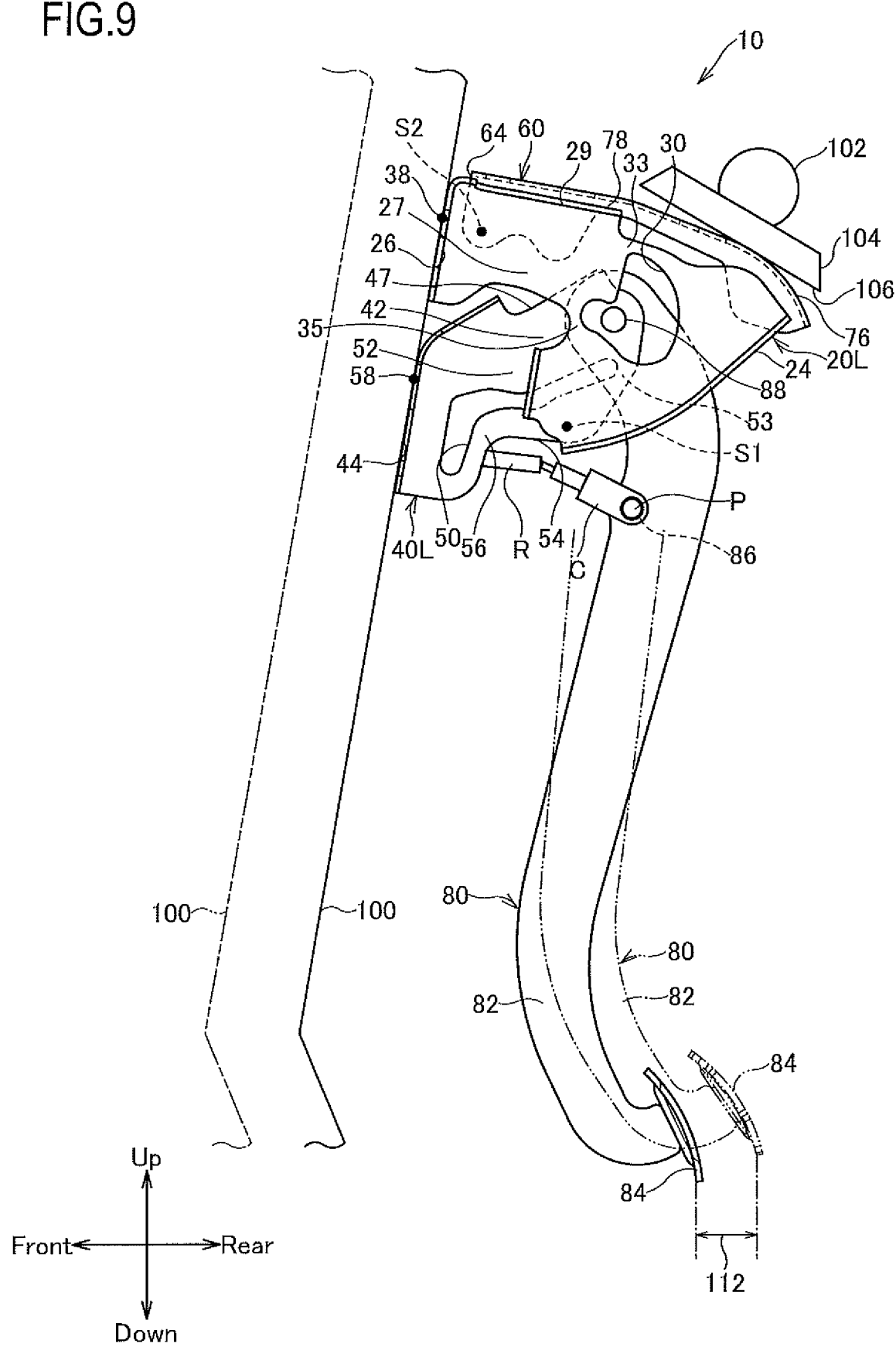
FIG. 9 is a side view illustrating the configuration of the vehicle operation pedal device at the time of vehicle collision.

In addition, as illustrated in FIG. 9, when the dash panel 100 is further displaced toward the vehicle rear side at the time of vehicle collision, the elongated parts 54 of the pair of lower support members 40L, 40R are further deformed by buckling, thereby increasing the advancing distance 112 of the depressing part 84 of the operation pedal 80.

And, in the vehicle operation pedal device 10 according to the present embodiment, the third thin part 53 of the pair of lower support members 40L, 40R is positioned on the lower side relative to the boss 88 of the operation pedal 80 and has a constricted shape. Accordingly, at the time of vehicle collision, even if the dash panel 100 is further displaced toward the vehicle rear side, the third thin parts 53 of the pair of lower support members 40L, 40R continue to be tensile deformed by the spot welding point S1.

(5) Others

Although one embodiment of the present disclosure has been described in detail, it should be understood that the various changes, substitutions, and alterations could be made hereto without departing from the spirit and scope of the disclosure.

For example, in the present embodiment, as illustrated in FIG. 6, although the spot welding point S1 is arranged around right below on the lower side relative to the boss 88 of the operation pedal 80, the spot welding point S1 may be arranged closer to the vehicle front side or the vehicle rear side if the spot welding point S1 is positioned on the lower side relative to the boss 88 of the operation pedal 80.

And, although in the present embodiment, the present disclosure is applied with the operation pedal 80 as a brake pedal, the present disclosure may be applied to each pedal used for a vehicle (for example, an accelerator pedal or a clutch pedal etc.).

The following description is the list of aspects of the embodiments of the present application.

The first vehicle operation pedal device is a vehicle operation pedal device including: an operation pedal provided with a boss at an upper end part and further provided with a depressing part at a lower end part, the depressing part being configured to be depressed in a direction towards a vehicle front side; a pair of upper support members fixed to a first vehicle component member disposed on the vehicle front side relative to the operation pedal, the pair of upper support members being configured to receive a load acting on the boss at both sides of the operation pedal at a stepping operation in a vehicle width direction when the depressing part of the operation pedal is depressed in the direction towards the vehicle front side in a non-collision state; a pair of lower support members fixed to the first vehicle component member and further fixed to the pair of upper support members at a welding spot on a vehicle lower side relative to the boss of the operation pedal at the both sides of the operation pedal in the vehicle width direction by spot welding, the pair of lower support members being configured to rotatably support the boss of the operation pedal while receiving the load acting on the boss at the both sides of the operation pedal in the vehicle width direction; an upper center support member laid between upper end parts of the pair of upper support members; and a support part pivotably supporting a tip part of an operating rod protruded toward a vehicle rear side from the first vehicle component member with respect to the operation pedal between the upper end part and the lower end part of the operation pedal, wherein: the upper center support member include a sliding receiving part configured to face a sliding surface of a second vehicle component disposed on the vehicle rear side relative to the first vehicle component member, the sliding surface extending in a direction toward the vehicle rear side so as to be inclined toward the vehicle lower side, the welding spot is positioned on an action line of a reaction force received when the sliding receiving part of the upper center support member abuts on the sliding surface of the second vehicle component member in a case where the first vehicle component member is displaced toward the vehicle rear side at a time of vehicle collision, the pair of lower support members include: a first weakened part provided between the boss of the operation pedal and the welding spot, where tensile deformation is easily generated within the pair of lower support members; and a second weakened part provided adjacent to the welding spot on the vehicle front side, where buckling deformation is easily generated within the pair of lower support members, the pair of upper support members include an escape hole that is configured to guide movement of the boss of the operation pedal toward the vehicle rear side in response to the buckling deformation of the second weakened part of the pair of lower support members and the tensile deformation of the first weakened part of the pair of lower support members after the sliding receiving part of the upper center support member is guided by sliding on the sliding surface of the second vehicle component member when the first vehicle component member is displaced toward the vehicle rear side at the time of vehicle collision, and the boss of the operation pedal is configured to pivot toward the vehicle lower side around the support part while moving to the vehicle rear side when the first vehicle component member is displaced toward the vehicle rear side at the time of vehicle collision.

The second vehicle operation pedal device is the first vehicle operation pedal device, wherein the boss of the operation pedal, the first weakened part of the pair of lower support members, and the welding spot are positioned on a circular arc with a position where the pair of lower support members is fixed to the first vehicle component member as a center.

The third vehicle operation pedal device is the first vehicle operation pedal device or the second vehicle operation pedal device, wherein the upper center support member includes a deformation start part serving as a starting point of a bending deformation, and wherein the pair of upper support members include: a third weakened part provided between the deformation start part of the upper center support member and the boss of the operation pedal, where the bending deformation is easily generated within the pair of upper support members; a fourth weakened part provided adjacent to the boss of the operation pedal on the vehicle front side, where the bending deformation is easily generated within the pair of upper support members; and a first rigid reinforcement part provided on the vehicle rear side relative to the third weakened part and the fourth weakened part, where rigidity of the pair of upper support members is reinforced.

The fourth vehicle operation pedal device is any one of the first to third vehicle operation pedal device, wherein the pair of upper support members include a second rigid reinforcement part where the rigidity of the pair of upper support members is reinforced on the vehicle front side relative to the boss of the operation pedal, and wherein the pair of lower support members include a third rigid reinforcement part where rigidity of the pair of lower support members is reinforced on the vehicle front side relative to the boss of the operation pedal.

The fifth vehicle operation pedal device is any one of the first to fifth vehicle operation pedal device, wherein the second weakened part of the pair of lower support members is an elongated plate shape and includes a round part protruded outside the pair of lower support members from a center of the second weakened part to the vehicle front side.

In the vehicle operation pedal device of the present disclosure, mounting the vehicle operation pedal device to a vehicle is completed by being fixed to the first vehicle component member disposed on the vehicle front side relative to the operation pedal, and the number of parts needful to prevent the depressing part of the operation pedal from moving rearward at the time of vehicle collision are fewer, and the mounting space in the vehicle vertical direction is small.

Incidentally, in the present embodiment, the first flange part 24 is one example of "a first rigid reinforcement part". The first bead part 27, the second flange part 29, and the spot welding point S2 are one example of "a second rigid reinforcement part". The first thin part 33 is one example of "a third weakened part". The second thin part 35 is one example of "a fourth weakened part". The shelf part 47 and the second bead part 52 are one example of "a third rigid reinforcement part". The third thin part 53 is one example of "a first weakened part". The elongated part 54 is one example of "a second weakened part". The lower fixed point 58 is one example of "a position where the pair of lower support members is fixed to the first vehicle component member". The triangular bead part 78 is one example of "a deformation start part". The dash panel 100 is one example of "a first vehicle component member". The instrument panel reinforcement 102 and the bracket for collision 104 are one example of "a second vehicle component member". The connection hole 86 of the connection pin P is one example of "a support part". The spot welding point S1 is one example of "a welding spot".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A vehicle operation pedal device comprising:
an operation pedal provided with a boss at an upper end part and further provided with a depressing part at a lower end part, the depressing part being configured to be depressed in a direction towards a vehicle front side;
a pair of upper support members fixed to a first vehicle component member disposed on the vehicle front side relative to the operation pedal, the pair of upper support members being configured to receive a load acting on the boss at both sides of the operation pedal at a stepping operation in a vehicle width direction when the depressing part of the operation pedal is depressed in the direction towards the vehicle front side in a non-collision state;
a pair of lower support members fixed to the first vehicle component member and further fixed to the pair of upper support members at a welding spot on a vehicle lower side relative to the boss of the operation pedal at the both sides of the operation pedal in the vehicle width direction by spot welding, the pair of lower support members being configured to rotatably support the boss of the operation pedal while receiving the load acting on the boss at the both sides of the operation pedal in the vehicle width direction;
an upper center support member laid between upper end parts of the pair of upper support members; and
a support part pivotably supporting a tip part of an operating rod protruded toward a vehicle rear side from the first vehicle component member with respect to the operation pedal between the upper end part and the lower end part of the operation pedal, wherein:
the upper center support member include a sliding receiving part configured to face a sliding surface of a second vehicle component disposed on the vehicle rear side relative to the first vehicle component member, the sliding surface extending in a direction toward the vehicle rear side so as to be inclined toward the vehicle lower side,
the welding spot is positioned on an action line of a reaction force received when the sliding receiving part of the upper center support member abuts on the sliding surface of the second vehicle component member in a case where the first vehicle component member is displaced toward the vehicle rear side at a time of vehicle collision,
the pair of lower support members include:
a first weakened part provided between the boss of the operation pedal and the welding spot, where tensile deformation is easily generated within the pair of lower support members; and
a second weakened part provided adjacent to the welding spot on the vehicle front side, where buckling deformation is easily generated within the pair of lower support members,
the pair of upper support members include an escape hole that is configured to guide movement of the boss of the operation pedal toward the vehicle rear side in response to the buckling deformation of the second weakened part of the pair of lower support members and the tensile deformation of the first weakened part of the pair of lower support members after the sliding receiving part of the upper center support member is guided by sliding on the sliding surface of the second vehicle component member when the first vehicle component member is displaced toward the vehicle rear side at the time of vehicle collision, and
the boss of the operation pedal is configured to pivot toward the vehicle lower side around the support part while moving to the vehicle rear side when the first vehicle component member is displaced toward the vehicle rear side at the time of vehicle collision.

2. The vehicle operation pedal device according to claim 1, wherein
the boss of the operation pedal, the first weakened part of the pair of lower support members, and the welding spot are positioned on a circular arc with a position where the pair of lower support members is fixed to the first vehicle component member as a center.

3. The vehicle operation pedal device according to claim 1, wherein
the upper center support member includes a deformation start part serving as a starting point of a bending deformation, and wherein
the pair of upper support members include:
a third weakened part provided between the deformation start part of the upper center support member and the boss of the operation pedal, where the bending deformation is easily generated within the pair of upper support members;
a fourth weakened part provided adjacent to the boss of the operation pedal on the vehicle front side, where the bending deformation is easily generated within the pair of upper support members; and
a first rigid reinforcement part provided on the vehicle rear side relative to the third weakened part and the fourth weakened part, where rigidity of the pair of upper support members is reinforced.

4. The vehicle operation pedal device according to claim 1, wherein
the pair of upper support members include a second rigid reinforcement part where the rigidity of the pair of upper support members is reinforced on the vehicle front side relative to the boss of the operation pedal, and wherein
the pair of lower support members include a third rigid reinforcement part where rigidity of the pair of lower support members is reinforced on the vehicle front side relative to the boss of the operation pedal.

5. The vehicle operation pedal device according to claim 1, wherein
the second weakened part of the pair of lower support members is an elongated plate shape and includes a round part protruded outside the pair of lower support members from a center of the second weakened part to the vehicle front side.

6. A vehicle operation pedal device comprising:
an operation pedal provided with a boss at an upper end part and further provided with a depressing part at a lower end part, the depressing part being configured to be depressed in a direction towards a vehicle front side;
a pair of upper support members fixed to a first vehicle component member disposed on the vehicle front side relative to the operation pedal, the pair of upper support members being configured to receive a load acting on the boss at both sides of the operation pedal at a stepping operation in a vehicle width direction when the depressing part of the operation pedal is depressed in the direction towards the vehicle front side in a non-collision state;

a pair of lower support members fixed to the first vehicle component member and further fixed to the pair of upper support members at a welding spot on a vehicle lower side relative to the boss of the operation pedal at the both sides of the operation pedal in the vehicle width direction by spot welding, the pair of lower support members being configured to rotatably support the boss of the operation pedal while receiving the load acting on the boss at the both sides of the operation pedal in the vehicle width direction;

an upper center support member laid between upper end parts of the pair of upper support members; and a support part pivotably supporting a tip part of an operating rod protruded toward a vehicle rear side from the first vehicle component member with respect to the operation pedal between the upper end part and the lower end part of the operation pedal, wherein:

the upper center support member include a sliding receiving part configured to face a sliding surface of a second vehicle component disposed on the vehicle rear side relative to the first vehicle component member, the sliding surface extending in a direction toward the vehicle rear side so as to be inclined toward the vehicle lower side, the welding spot is positioned on an action line of a reaction force received when the sliding receiving part of the upper center support member abuts on the sliding surface of the second vehicle component member in a case where the first vehicle component member is displaced toward the vehicle rear side at a time of vehicle collision, the pair of lower support members include:
  a first portion with reduced cross-sectional area provided between the boss of the operation pedal and the welding spot, where tensile deformation is easily generated within the pair of lower support members; and
  a second portion that is column shaped and provided adjacent to the welding spot on the vehicle front side, where buckling deformation is easily generated within the pair of lower support members, the pair of upper support members include an escape hole that is configured to guide movement of the boss of the operation pedal toward the vehicle rear side in response to the buckling deformation of the second portion of the pair of lower support members and the tensile deformation of the first portion of the pair of lower support members after the sliding receiving part of the upper center support member is guided by sliding on the sliding surface of the second vehicle component member when the first vehicle component member is displaced toward the vehicle rear side at the time of vehicle collision, and the boss of the operation pedal is configured to pivot toward the vehicle lower side around the support part while moving to the vehicle rear side when the first vehicle component member is displaced toward the vehicle rear side at the time of vehicle collision.

7. The vehicle operation pedal device according to claim 6, wherein
  the boss of the operation pedal, the first portion of the pair of lower support members, and the welding spot are positioned on a circular arc with a position where the pair of lower support members is fixed to the first vehicle component member as a center.

8. The vehicle operation pedal device according to claim 6, wherein
  the upper center support member includes a deformation start part serving as a starting point of a bending deformation, and wherein
  the pair of upper support members include:
    a third portion with reduced cross-sectional area provided between the deformation start part of the upper center support member and the boss of the operation pedal, where the bending deformation is easily generated within the pair of upper support members;
    a fourth portion with reduced cross-sectional area provided adjacent to the boss of the operation pedal on the vehicle front side, where the bending deformation is easily generated within the pair of upper support members; and
    a first rigid reinforcement part provided on the vehicle rear side relative to the third portion and the fourth portion, where rigidity of the pair of upper support members is reinforced.

9. The vehicle operation pedal device according to claim 6, wherein
  the pair of upper support members include a second rigid reinforcement part where the rigidity of the pair of upper support members is reinforced on the vehicle front side relative to the boss of the operation pedal, and wherein
  the pair of lower support members include a third rigid reinforcement part where rigidity of the pair of lower support members is reinforced on the vehicle front side relative to the boss of the operation pedal.

10. The vehicle operation pedal device according to claim 6, wherein
  the second portion of the pair of lower support members is an elongated plate shape and includes a round part protruded outside the pair of lower support members from a center of the second portion to the vehicle front side.

* * * * *